United States Patent
Mahowald et al.

(10) Patent No.: US 6,836,493 B2
(45) Date of Patent: Dec. 28, 2004

(54) LASER INITIALIZATION IN FIRMWARE CONTROLLED OPTICAL TRANSCEIVER

(75) Inventors: Peter H Mahowald, Las Altos, CA (US); Kevin Reid Woolf, Salinas, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/346,481

(22) Filed: Jan. 15, 2003

(65) Prior Publication Data

US 2004/0136422 A1 Jul. 15, 2004

(51) Int. Cl.$^7$ ................................................. H01S 3/08
(52) U.S. Cl. ................................................. 372/38.01
(58) Field of Search ........................... 372/38.1–38.09, 372/29.02; 398/197

(56) References Cited

U.S. PATENT DOCUMENTS

| | | | |
|---|---|---|---|
| 4,709,416 A | * | 11/1987 | Patterson .................... 398/197 |
| 4,945,541 A | | 7/1990 | Nakayama |
| RE36,491 E | | 1/2000 | Gilliland et al. |
| 6,108,114 A | | 8/2000 | Gilliland et al. |
| 6,160,647 A | | 12/2000 | Gilliland et al. |
| 6,438,285 B1 | | 8/2002 | DeCusatis et al. |
| 6,496,525 B1 | | 12/2002 | Kimura |
| 6,516,015 B1 | | 2/2003 | Kimura |

* cited by examiner

*Primary Examiner*—Quyen Leung

(57) ABSTRACT

An optical transceiver module includes a laser configured to provide an optical output signal having a power level that is based on a bias current. The optical transceiver module includes a controller is configured to cause the laser to be biased with an initial bias current, to receive a monitoring signal indicative of the power level, to compare the power level to a desired power level range, and to cause the laser to be biased with an adjusted bias current if the power level is not within the desired power level range.

48 Claims, 11 Drawing Sheets

LASER INITIALIZATION IN FIRMWARE CONTROLLED OPTICAL TRANSCEIVER

THE FIELD OF THE INVENTION

The present invention relates generally to optical transceiver modules, and more particularly to optical transceiver modules employing a receiver and a transmitter having a laser operating in conjunction with a controller to provide improved laser initialization performance.

BACKGROUND OF THE INVENTION

The use of fiber optics technology in data communication continues to expand at a rapid pace. Optic fiber transmission links are used widely in connecting computer, telephone, and instrumentation systems. Fiber optic systems have tremendous advantages over systems utilizing copper conductors. Besides being smaller and lighter than copper conductor systems, fiber optic systems offer total electrical isolation, extremely high-speed wideband capability, and complete immunity to both noise and the broad spectrum of interference. Most importantly, fiber optic communication links are much less expensive than copper conductor systems.

A basic fiber optic communication link has three components: a transmitter, a receiver, and a fiber optic cable. The transmitter contains a light-emitting element that converts an electrical current into an optical signal. The light emitting diode is typically a light-emitting diode, a laser diode, or a vertical cavity surface-emitting laser. The receiver contains a light-detecting element that converts the light signal back into an electrical current. The fiber optic cable connects the transmitter to the receiver and carries the optical signal between them.

More commonly, however, a fiber optic link comprises a pair of optical transceivers coupled by a pair of fiber optic cables. An optical transceiver combines a transmitter with a receiver to form a single unit that provides all required electrical/optical conversions necessary to both transmit and receive optical data. The transmitter of the first transceiver sends data in the form of an optical signal via one of the fiber optic cables to the receiver of the second transmitter which subsequently converts the optical signal to an electrical signal. Likewise, the transmitter of the second transceiver sends an optical signal via the other fiber optic cable to the receiver of the first transceiver.

In an optical transceiver module utilizing a laser as the light emitting element, one critical task which must be performed quickly and accurately in order to provide a quality product is initializing, or starting, the laser. Each time the laser is powered-up, its optical output power level must be brought up and stabilized within a desired range, or window, for safe operation. The laser's optical output power level is controlled by adjusting a bias current provided to the laser. Laser initialization generally occurs each time the optical transceiver module is turned on, or after some type of transceiver fault or disable has been negated. Rapid start-up of the laser is desirable to place the transceiver into operation as quickly as possible.

Historically, optical transceiver modules have been constructed as "hard-coded" integrated circuits (IC's). In other words, individual circuits comprising a plurality of transistors are designed into the IC with each circuit dedicated to carrying out a single task related to the control and operation of the transceiver. Common practice now is to store a manufacturing target for the laser power in a circuit dedicated to initializing the laser. If the actual optical output power is too low at start-up, the circuit increments the bias current. Likewise, if the optical output power is too high, the circuit decrements the bias current. A major disadvantage of this approach is that several iterations are sometimes required to bring the laser output power within the desired window, which delays the ability of the optical transceiver to begin transmitting optical data.

Optical data systems would benefit from an optical transceiver module than can more quickly and more accurately bring the optical output power of a laser to a value within a desired operating window upon initialization.

SUMMARY OF THE INVENTION

One aspect of the present invention provides an optical transceiver module including a laser and a controller. The laser is configured to provide an optical output signal having a power level that is based on a bias current. The controller is configured to cause the laser to be biased with an initial bias current, to receive a monitoring signal indicative of the power level, to compare the power level to a desired power level range, and to cause the laser to be biased with an adjusted bias current if the power level is not within the desired power level range.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
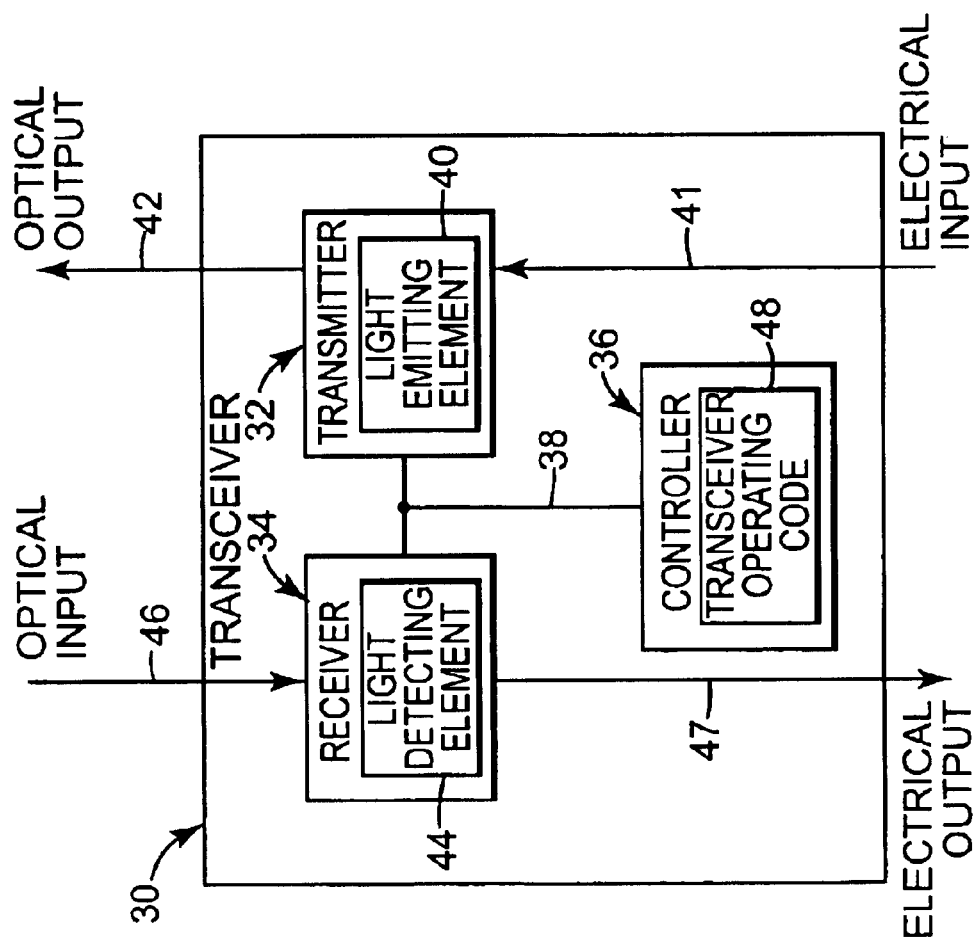
FIG. 1 is a block diagram illustrating one embodiment of an optical transceiver module according to the present invention.

An optical transceiver module according to the present invention is illustrated generally at 30 in FIG. 1. Optical transceiver module 30 includes a transmitter 32, a receiver 34, and a controller 36. Controller 36 is coupled to and communicates with transmitter 32 and receiver 34 via a path 38. Transmitter 32 includes a light-emitting element 40 configured to receive an electrical input signal via a path 41 and to convert the electrical signal to an optical output signal provided via an optical fiber 42. In one embodiment, light-emitting element 40 is a laser. In one embodiment, transmitter 32 is an integrated circuit. Receiver 34 includes a light-detecting element 44 configured to detect an optical input signal received via an optical fiber 46 and to convert the optical input signal to an electrical signal provided via a path 47. In one embodiment, receiver 34 is an integrated circuit.

Controller 36 includes a transceiver operating code 48 and is configured to operate in conjunction with transmitter 32 and receiver 34 to control a plurality of tasks associated with the operation of optical transceiver module 30. Controller 36 includes a transceiver operating code 48 comprising a plurality of task code modules. Each task code module has an assigned priority level, and contains instructions for performing at least one task of a plurality of tasks for controlling the operation of optical transceiver module 30. Transceiver operating code 48 further comprises a priority code configured to control the order in which controller 36 executes the plurality of task code modules based on their assigned priority levels.

By utilizing a controller in conjunction with a transmitter and a receiver, optical transceiver module 30 according to the present invention provides a more flexible optical transceiver design than conventional optical transceivers utilizing "hard coded" integrated circuits. For example, optical transceiver 30 is better configured to and more easily provides monitoring of and reporting to users of transceiver operating characteristics, such as the transceiver's internal temperature, laser output power, and laser biasing. Furthermore, by employing a priority code for executing transceiver module 30 control tasks in order of an assigned priority level, controller 36 provides for reliable transceiver operation by ensuring that higher priority tasks are completed without fail on a frequent basis while still ensuring that lower priority tasks are completed in a timely fashion.

Figure 2:
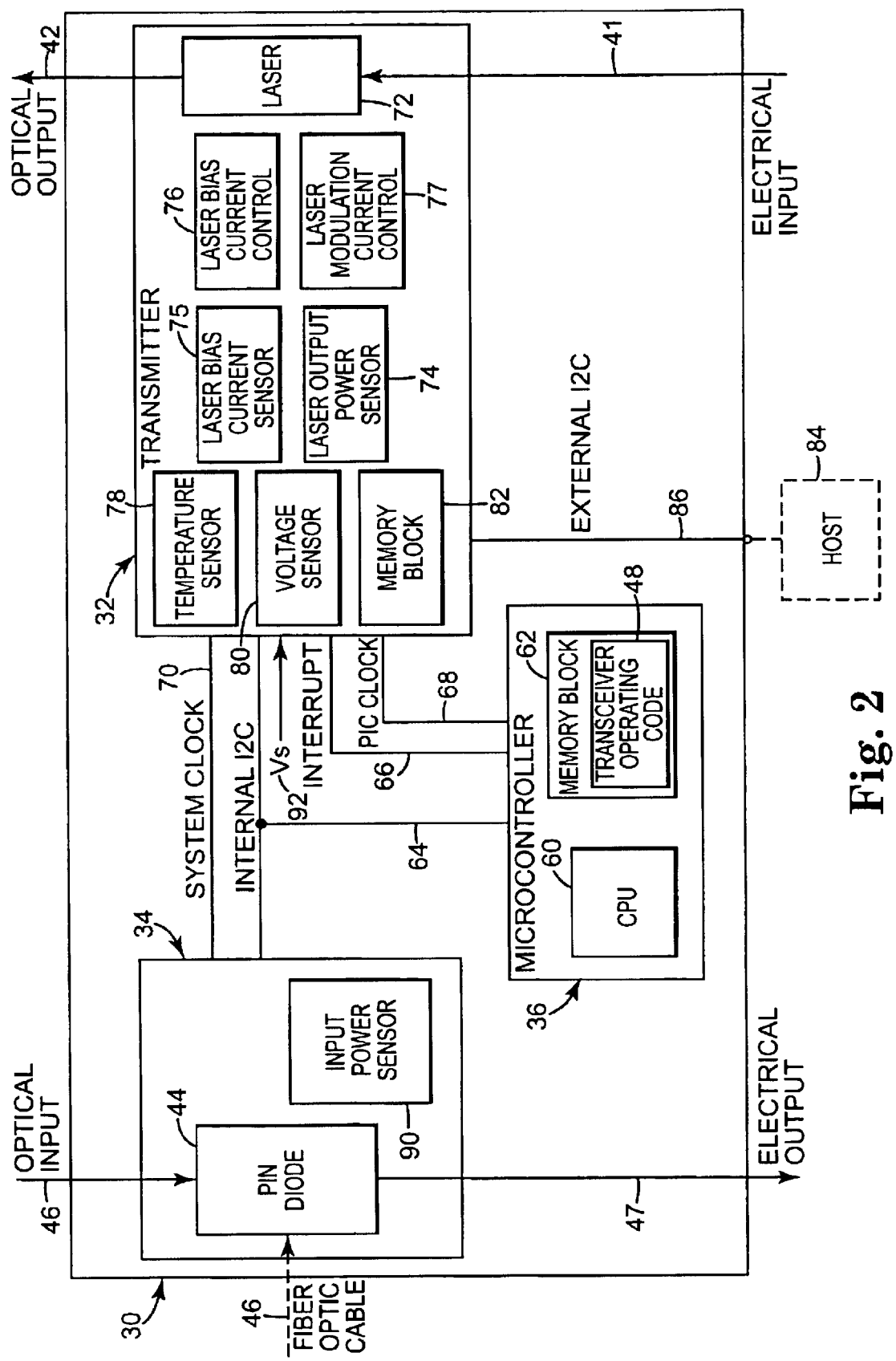
FIG. 2 is a block diagram illustrating one embodiment of an optical transceiver module according to the present invention.

FIG. 2 illustrates one exemplary embodiment of optical transceiver module 30 according to the present invention. Optical transceiver module 30 includes transmitter 32, receiver 34, and controller 36, which in one embodiment is a microcontroller comprising a central processing unit (CPU) 60 and a memory block 62, which further includes transceiver operating code 48. In one embodiment, memory block 62 is an electrically erasable programmable read only memory (EEPROM) device. Microcontroller 36 is electrically coupled to transmitter 34 and receiver 36 via an internal connection 64 which is any suitable type of serial or parallel connection, such as a two-wire serial connection. One suitable serial two-wire connection is an I2C connection as provided by the I2C-Bus Specification available from Phillips Semiconductor at http://www.semiconductors.philips.com/acrobat/various/I2C_Bus_Specification_ 3.pdf. When internal connection 64 is an I2C connection, transmitter 32, receiver 34, and microcontroller 36 each include an I2C interface as described by the Phillips reference above. In one embodiment, optical transceiver module 30 conforms to the SFF-8074i Specification for Small Form Pluggable (SFP) Transceivers which is incorporated herein by reference. The SFF-8074i Specification is available at http://www.sffcommitte.com, or at ftp://ftp.seagate.com/sff/.

Transmitter 32 includes a laser 72, a laser output power sensing circuit 74, a laser bias current sensing circuit 75, a laser bias current control circuit 76, a laser modulation current control circuit 77, a temperature sensing circuit 78, a voltage sensing circuit 80, and a memory block 82. Laser bias current control circuit 76 controls the average optical power of laser 72, while laser modulation current control circuit 77 controls A/C modulation. In one embodiment, transmitter 32 is an integrated circuit. In one embodiment, laser 72 is a vertical cavity surface emitting laser (VCSEL) which is connectable to and provides an optical output signal via optical fiber 42. In one embodiment, memory block 82 is a static random access memory (SRAM) device. In one embodiment, transmitter 32 is connectable to an external host 84 via an external connection 86. External connection 86 is any suitable type of serial or parallel connection, such as a two-wire serial connection. One suitable two-wire serial connection is an I2C connection as provided by the I2C-Bus Specification available from Phillips Semiconductor at http://www.semiconductors.philips.com/acrobat/various/I2C_Bus_Specification_ 3.pdf. The host 84 may be a customer interface or a test apparatus. When external connection 64 is an I2C connection, transmitter 32 and host 84 include an I2C interface as described the Phillips reference. When internal connection 64 and external connection 86 are configured as I2C connections, transmitter memory block 82 is utilized as a buffer, and microcontroller 36 and host 84 communicate via internal connection 64, memory block 82, and external connection 86 using standard I2C protocol.

Laser output power sensing circuit 74 is configured to measure and provide a value representative of average optical output power provided by laser 72. In one embodiment, laser output power sensing circuit 74 comprises a photodiode that samples the optical output signal provided by laser 72 and provides a current having a value representative of the optical output power of laser 72. Laser bias current sensor 76 is configured to measure and provide to a value representative of an average bias current of laser 72. Temperature sensor 78 is configured to measure and provide a value representative of the temperature of optical transceiver module 30. Voltage sensing circuit 80 is configured to measure and provide a value representative of a supply voltage 92 to transmitter 32. The representative values described above are provided to microcontroller 36 via internal connection 64.

Receiver 34 further includes light detecting element 44 and an optical input power sensing circuit 88. In one embodiment, receiver 34 is an integrated circuit. In one embodiment, light-detecting element 44 is a PIN diode 88 which is connectable to and receives an optical input signal via optical fiber 46. Input power sensing circuit 88 is configured to measure and provide to microcontroller 36 via internal connection 64 a value representative of an average power or a peak-to-peak power of an optical input signal received via optical fiber 46.

In order to be made operational, optical transceiver module 30 must first be initialized and calibrated. Module initialization involves the execution of a plurality of tasks that occurs each time optical transceiver module 30 is powered-up. Examples of tasks occurring during initialization include setting a plurality of registers internal to microcontroller 36 for customer, and clearing a plurality of register internal to microcontroller 36. Calibration generally occurs as part of a manufacturing process, and involves a plurality of tasks wherein optical transceiver module 30 is uploaded with both general and module-specific customer data in order to make the module "customer ready." In other words, optical transceiver module 30 is uploaded with data that will enable it to perform all expected tasks according design and performance requirements. In this respect, each optical transceiver module according to the present invention may be "tuned" for operation in an individual customer's unique operating environment.

After module calibration and initialization have been completed, optical transceiver module 30 is operational and capable of transmitting and receiving optical data. However, to provide reliable operation, microcontroller 36 must execute the plurality of task code modules for controlling the operation of optical transceiver module 30 based on the task code modules' assigned priority levels. In one embodiment, the priority code of transceiver operating code 48 includes a nested loop to control the timing, order, and-frequency in which the plurality of task code modules are executed by microcontroller 36. In one embodiment, the priority code includes a loop counter to control the timing, order, and frequency in which the plurality of task code modules are executed by microcontroller 36.

In one embodiment, microcontroller 36 includes a plurality of operating code modules with each operating code module comprising at least one task code module. In one embodiment, the plurality of operating code modules includes at least a laser monitoring operating code module and a system monitoring operating code module. The laser monitoring code module comprises a plurality of task code modules for monitoring and maintaining the optical output power of laser 72 at a desired target level. The system monitoring operating code module comprises a plurality of tasks for monitoring a plurality of optical transceiver module 30 operating parameters. Example operating parameters are transceiver module 30 temperature and laser 72 average bias current. Monitoring of laser 72 is a critical task of microcontroller 36 and is assigned the highest task priority level. Other tasks, such as tasks associated with the system monitoring module, are "time-partitioned" from the task of monitoring laser 72 and are not granted as significant an amount of CPU 60 processing time as is granted to tasks for controlling laser monitoring.

Figure 3:
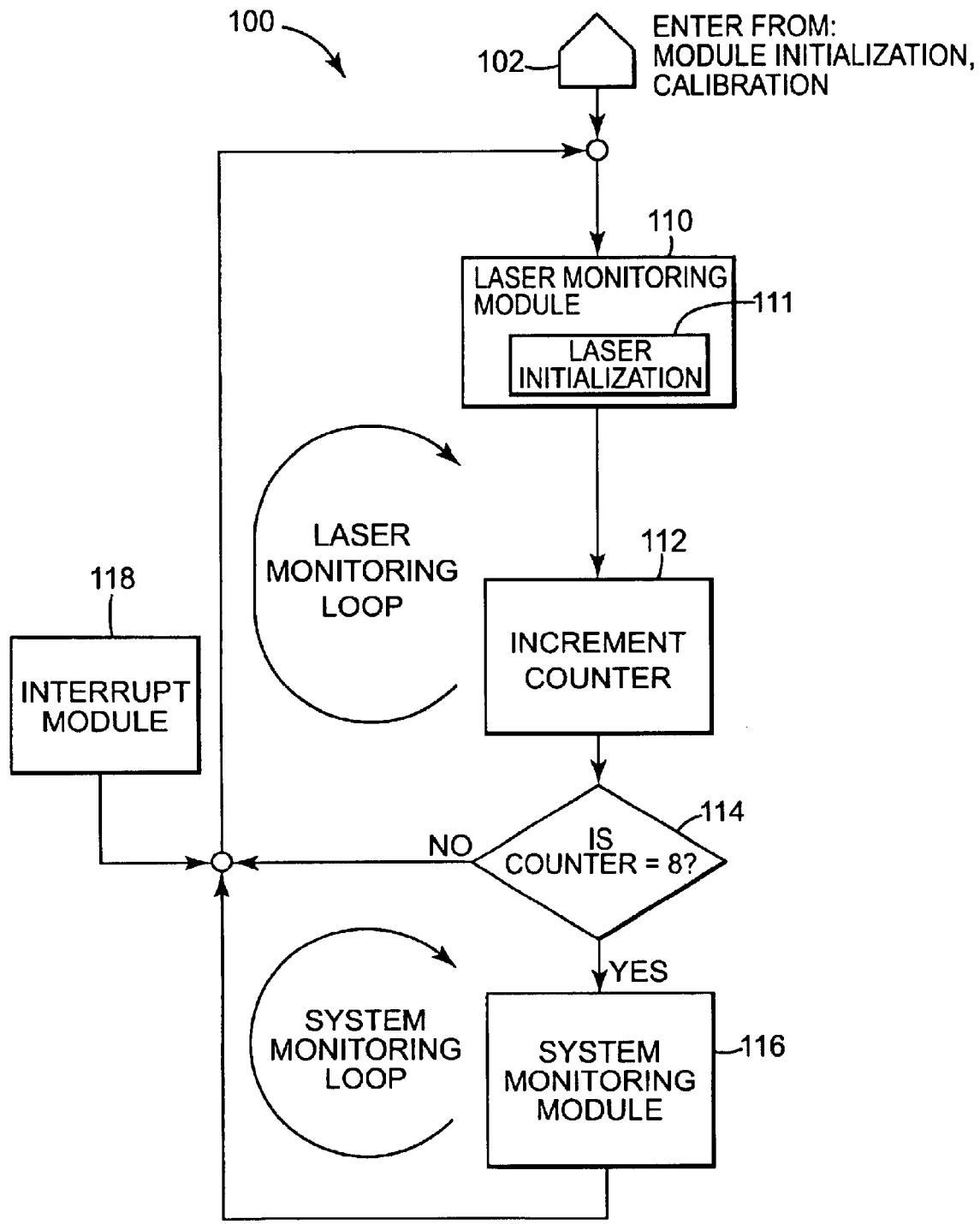
FIG. 3 is a flow diagram illustrating one exemplary embodiment of a process employed by an optical transceiver module according to the present invention during data communication for prioritizing the a plurality of tasks for controlling the transceiver operation.

FIG. 3 is a flow diagram 100 illustrating one exemplary embodiment of a process employed by microcontroller 30 for prioritizing the execution of tasks associated with the laser monitoring and system monitoring operating code modules for controlling the operation of optical transceiver module 30 illustrated in FIG. 2. Process 100 begins at step 102 after module calibration/initialization have been completed. Process 100 then proceeds to the laser monitoring operating code module at step 110, where the operation of laser 72 is monitored and controlled. Laser monitoring module at step 110 comprises a plurality of tasks for monitoring the optical output power level of laser 72 and adjusting as required the bias current provided to laser 72 by bias control circuit 76 in order to maintain the output power at a level substantially equal to a desired target value.

The laser monitoring module at step 110 further includes a plurality of tasks for initializing laser 72 as indicated at 111. Laser initialization involves the execution of tasks for bringing up laser 72 to a desired target output power level from a power-off state. Tasks for controlling the initialization of laser 72 are generally not executed with the frequency of other laser monitoring module tasks. Typically, tasks for controlling laser initialization are only executed subsequent to an initial power-up of transceiver module 30 or after a system fault requires a shutdown and re-initialization of laser 72. The execution of tasks associated with the laser monitoring module at step 110, including tasks related to laser initialization 111, is discussed below in greater detail.

Once microcontroller 36 has executed the plurality of tasks associated with the laser monitoring module at step 110, process 100 moves to step 112 where a laser monitoring loop counter is incremented by a value of one. Process 100 then proceeds to step 114, where microcontroller 36 queries whether the loop counter is equal to a threshold value. In one embodiment, the threshold value for the laser monitoring loop counter is eight. While process 100 indicates a loop counter having a threshold value of "8" at step 114, this value can be increased or decreased according to the amount of CPU 60 processing time desired to be allotted to the laser monitoring operating code module tasks. At step 114, if the loop counter is less than eight, process 100 returns to step 110 where microcontroller 36 again executes the plurality of tasks of the laser monitoring module. If the loop counter has a value of eight, microcontroller 36 deems laser 72 to be sufficiently stable, and process 100 proceeds to step 116 to perform the plurality of tasks associated with the system monitoring operating code module.

The system monitoring module at step 116 comprises a plurality of tasks for monitoring and adjusting system operating parameters that assist in controlling the operation of optical transceiver module 30. While a variety of values are monitored and adjusted, the tasks are primarily associated with adjusting optical transceiver module 30 system operating parameters for environmental conditions, and for correcting system errors. After microcontroller 36 executes at least one task of the system monitoring operating code module, microprocessor 36 sets the laser monitoring loop counter to zero and process 100 returns to step 110 to once again begin executing tasks for monitoring laser 72. The execution of system monitoring operating code module tasks occurring at step 116 is discussed in greater detail below.

Interrupt operating code module 118 comprises a plurality of task code modules for controlling a plurality of tasks executed in response to various types of interrupt signals received by microcontroller 36 from various sources. Microcontroller 36 responds to an interrupt signal by initially suspending the laser and system monitoring task prioritization process to determine the type of interrupt signal received. Depending on the type interrupt signal, microcontroller 36 either immediately executes the corresponding plurality of task code modules before resuming the laser and system monitoring task prioritization process, or executes them with other task code modules based on their assigned priority level. Interrupt module 118 is discussed in greater detail below.

Flow diagram 100 of FIG. 3 illustrates the priority given by microcontroller 36 to performing tasks associated with the monitoring of laser 72 as compared to tasks associated with system monitoring tasks. Thus, flow diagram 100 reflects the critical nature of monitoring and controlling the power of the optical output signal provided by laser 72. With the laser monitoring loop counter at a value of eight, tasks associated with the laser monitoring code module are executed eight times for every one time a task associated with the system monitoring module is executed.

Figure 4:
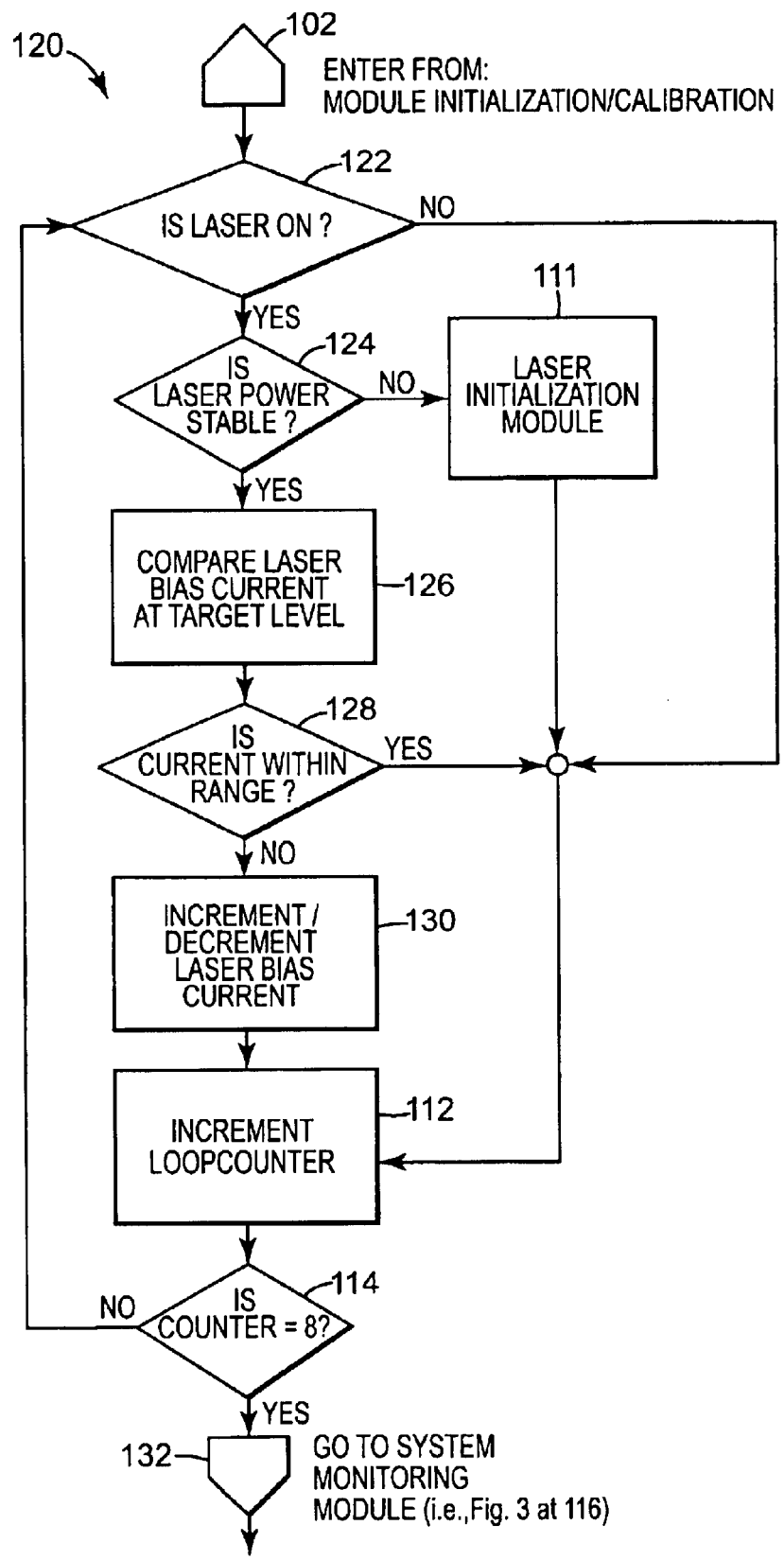
FIG. 4 is a flow diagram illustrating one exemplary embodiment of a process employed by an optical transceiver module according to the present invention for monitoring a laser.

FIG. 4 is a flow diagram illustrating one exemplary embodiment of a process 120 for monitoring laser 72 as discussed generally at steps 112 and 114 of FIG. 3. Process 120 begins at step 102, after calibration and initialization of optical transceiver module 30 have been completed. Process 120 then proceeds to step 122 where microcontroller 36 queries whether laser 72 is on. If the answer to the step 122 query is "yes," process 120 proceeds to step 124.

At step 124, microcontroller 36 determines whether the output power of laser 72 is stable. Microcontroller reads from laser output power sensing circuit 74 a value that is representative of the present output power level of laser 72. Microcontroller 36 then compares the value representative of the present output power level of laser 72 to a desired output power range for laser 72 stored in memory block 62. If value representative of the present output power is not within the desired output power range, process 120 proceeds to the laser initialization module at step 111. As described above, laser initialization involves executing a plurality of tasks for bringing up laser 72 as quickly as possible from a power off condition to providing an output signal having a power level within a desired range. Initialization of laser 72 is discussed in greater detail below. Once laser 72 has been initialized at step 111, process 120 proceeds to step 112.

If the value representative of the present output power of laser 72 at step 124 is within the desired range stored in memory block 62, process 120 proceeds to step 126. At step 126, microcontroller 36 determines whether the laser bias current is within a desired target range. Microcontroller 36 reads from laser bias current sensing circuit 75 a value that is representative of the present bias current level of laser 72 and converts the representative value to a real world value. Microcontroller 36 then compares the real world value of the present biasing current to a desired bias current target range stored in memory block 62. If the present bias current level is within the desired target range, process 120 proceeds to step 112.

If the present bias current level is not within the desired target range, process 120 proceeds to step 130. If the bias current level is less than the desired target range, microcontroller 36 causes laser bias current control circuit 76 to increase the laser bias current by a predetermined incremental amount. If the bias current level is greater than the desired target range, microcontroller 36 causes laser bias current control circuit 76 to decrease the laser bias current by the predetermined incremental amount. After the bias current has been increased or decreased, process 120 proceeds to step 112.

At step 112, microcontroller 36 increments the laser monitoring loop counter by a value of one. Process 120 then proceeds to step 114 where microcontroller 36 queries whether the loop counter has a value of eight. As described previously, while process 120 indicates a loop counter having a threshold value of eight, this value can be increased or decreased according to the amount of CPU 60 processing time is desired to be allotted to laser monitoring. If the monitoring loop counter has a value less than eight, process 120 returns to step 122 to continue executing tasks associated with monitoring of laser 72. If the monitoring loop counter has a value of eight, laser 72 is deemed to be sufficiently stable, and process 120 proceeds to step 132 at which point tasks associated with the system monitoring operating code module will be executed.

Figure 5:
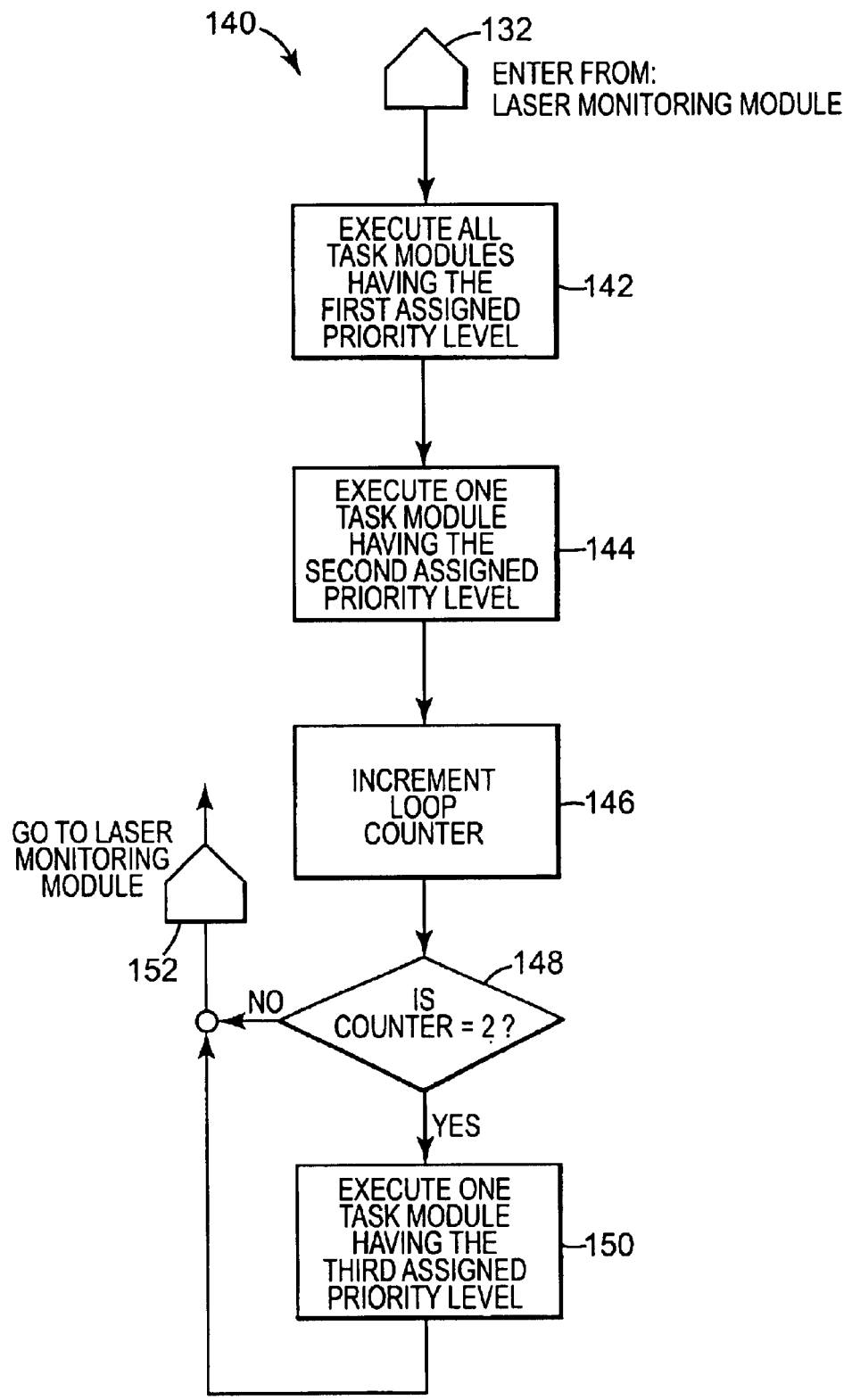
FIG. 5 is a flow diagram illustrating one exemplary embodiment of a process employed by an optical transceiver module according to the present invention for prioritizing a plurality of tasks associated with monitoring of the transceiver module.

In FIG. 5, a flow diagram illustrating one exemplary embodiment of a system monitoring process 140 for optical transceiver 30 according to the present invention. System monitoring comprises a plurality of task code modules primarily for monitoring and adjusting various transceiver module 30 operating parameters for environmental changes, correcting system errors, and for maintenance. In one embodiment, the plurality of system monitoring task code modules is subdivided to form three groups, with the first group being assigned a first priority level, the second group being assigned a second priority level, and the third group being assigned a third priority level, wherein the first group comprises task code modules deemed to have the highest priority and those in the third group deemed to have the lowest priority.

System monitoring process 140 begins at step 132 after a laser monitoring process, such as laser monitoring process 120, has deemed laser 72 to be sufficiently stable so that microcontroller 36 to devote to CPU 60 processing time to system monitoring tasks without jeopardizing the operation of laser 72. Process 140 then proceeds to step 142 where microcontroller 36 executes each task code module from the first group of monitoring tasks. Examples of tasks performed by task code modules within the first group of are adjusting laser 72 output modulation based on the system temperature and setting alarms for monitoring laser 72 output power for eye safety shutdown.

When all of the task code modules of the first group have been executed, process 140 proceeds to step 144 where microcontroller 36 executes one task code module from the second group. Examples of tasks performed by task code modules within the second group are temperature adjustment of the laser output power and monitoring transmitter supply voltage fault settings. In one embodiment, microcontroller 36 maintains a circular list of task code modules from the second group and tracks which task code module was the last to be executed. When the last task code module on the list has been executed, microcontroller returns to the first task code module on the list.

After executing one task code module from the second group, process 140 proceeds to step 146, where a system monitoring loop counter is incremented by a value of one. Process 140 then proceeds to step 148, where microcontroller 36 queries whether the system monitoring loop counter is equal to a predetermined threshold value. In one embodiment, the threshold value for the system monitoring loop counter is two. While process 140 indicates a system monitoring loop counter having a value of two at step 148, this value can be increased or decreased depending on how much CPU 60 processing time is desired to be dedicated to executing system monitoring task code modules from the third group.

If the system monitoring loop counter is less than two, process 140 proceeds to step 152. If the system monitoring loop counter has a value of two, process 140 proceeds to step 150 where microcontroller 36 executes one system monitoring task code module from the third group. Examples of tasks performed by task code modules within the third group are setting and clearing alarm and warning flags. In one embodiment, microcontroller 36 maintains a circular list of task code modules from the third group and tracks which task code module was the last to be executed. When the last task code module on the list has been executed, microcontroller returns to the first task code module on the list.

After executing one task code module from the second group, microcontroller 36 sets the value of the system monitoring loop counter to zero, and process 140 proceeds to step 152. At step 152, process 140 exits to a laser monitoring process, such as laser monitoring process 120.

Interrupt operating code module at 118 comprises a plurality of task code modules for controlling a plurality of tasks executed in response to various types of interrupt signals received by microcontroller 36 from various sources. There are a plurality of types of interrupt signals, with the task code modules for controlling tasks executed in response to an interrupt signal having an assigned priority level based on the interrupt signal type. In one embodiment, interrupt signals are of a first type or a second type.

In response to receipt of an interrupt signal, microcontroller 36 initially suspends the laser and system monitoring task prioritization process to determine the type of the received interrupt signal. If the interrupt signal is of the first type, microcontroller 36 immediately executes the corresponding plurality of task code modules before resuming the laser and system monitoring task prioritization process. Examples of interrupt signals of the first type are laser disable and fault signals.

If the interrupt signal is of the second type, microprocessor 36 places the corresponding plurality of task code modules at an appropriate location within the laser and system monitoring prioritization process, and then resumes the prioritization process wherein the plurality of tasks associated with the interrupt signal are executed with other task code modules based on their assigned priority level. Examples of interrupt signals of the second type are host requests to write data to a memory.

In order to provide a quality optical transceiver module, one task which must be performed flawlessly is starting, or initializing the laser. Laser initialization involves the execution of a plurality of tasks for bringing up laser 72 as quickly as possible from a power off condition to providing an optical output signal having a power level within a desired range. Laser initialization generally occurs subsequent to transceiver module 30 being powered up, or after a transceiver system fault or disable had been removed.

Figure 6A:
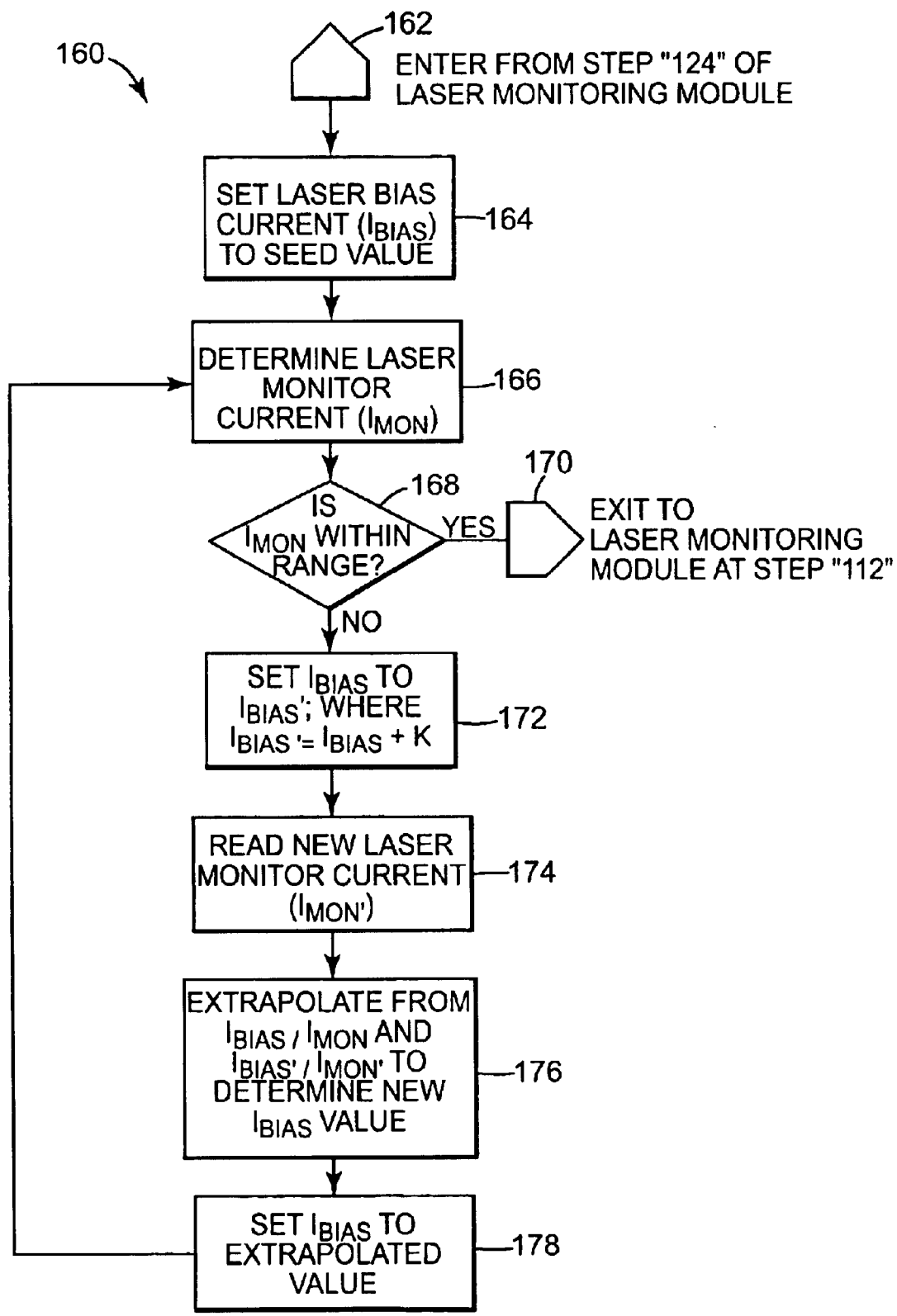
FIG. 6A is a flow diagram illustrating one exemplary embodiment of a process for initializing a laser of an optical transceiver module according to the present invention.

FIG. 6A is a flow diagram illustrating one exemplary embodiment of a process 160 for initializing laser 72 according to the present invention. Process 160 begins at step 162 after a laser monitoring process determines that laser 72 output power is not stable, such as at step 124 of laser monitoring process 120 illustrated by FIG. 2. Process 160 then proceeds to step 164 where microcontroller 36 reads a laser bias current seed value from memory block 62. The seed value is a value of laser bias current that resulted in laser 72 producing an optical output signal at manufacturer that had an output power level within a desired output power level target range. Microcontroller 36 stores the seed value in laser bias current control circuit 76, causing control circuit 76 to bias laser 72 with a bias current ($I_{BIAS}$) having a value substantially equal to the seed value.

Process 160 then proceeds to step 166 where microcontroller 36 reads a value of an optical output signal monitoring current ($I_{MON}$) from laser output power sensing circuit 74. In one embodiment, laser output power sensing circuit 74 comprises a photodiode that samples the optical output signal provided by laser 72 and provides the $I_{MON}$ current level which has a value representative of the optical output power of laser 72.

Process 160 then proceeds to step 168 where microcontroller 36 compares the $I_{MON}$ value from step 166 to a desired target range for $I_{MON}$ stored in memory block 62. If the $I_{MON}$ value is within the desired range, process 160 proceeds to step 170 where it exits to step 112 of laser monitoring process 120. If the $I_{MON}$ value is not within the desired range, process 160 proceeds to step 172.

At step 172, microcontroller causes laser bias current control circuit 76 to increment the laser bias current by a constant value (K) stored in memory block 62, thereby causing laser 72 to be biased an incremented bias current ($I_{BIAS'}$). Process 160 then proceeds to step 174, where microprocessor 36 reads a value of the optical output signal monitoring current provided by laser output power sensing circuit after laser 72 is biased with $I_{BIAS'}$. The new value for the optical output signal monitoring current is referred to as $I_{MON'}$.

Process 160 then proceeds to step 178, where microcontroller 36 performs an mathematical extrapolation using the values of $I_{BIAS}$, $I_{MON}$, $I_{BIAS'}$, and $I_{MON'}$ to calculate a desired level for the laser bias current that will cause laser 72 to provide an optical output signal having an output power level that will result in the output signal monitoring current ($I_{MON}$) to be within the desired target range. Process 160 then proceeds to step 178, where microcontroller 36 stores the calculated value for the laser bias current in laser bias control circuit 76. Laser bias current control circuit 76 then biases laser 72 with the calculated bias current, causing laser 72 to provide an optical output signal having an output power level substantially within the desired range.

Figure 6B:
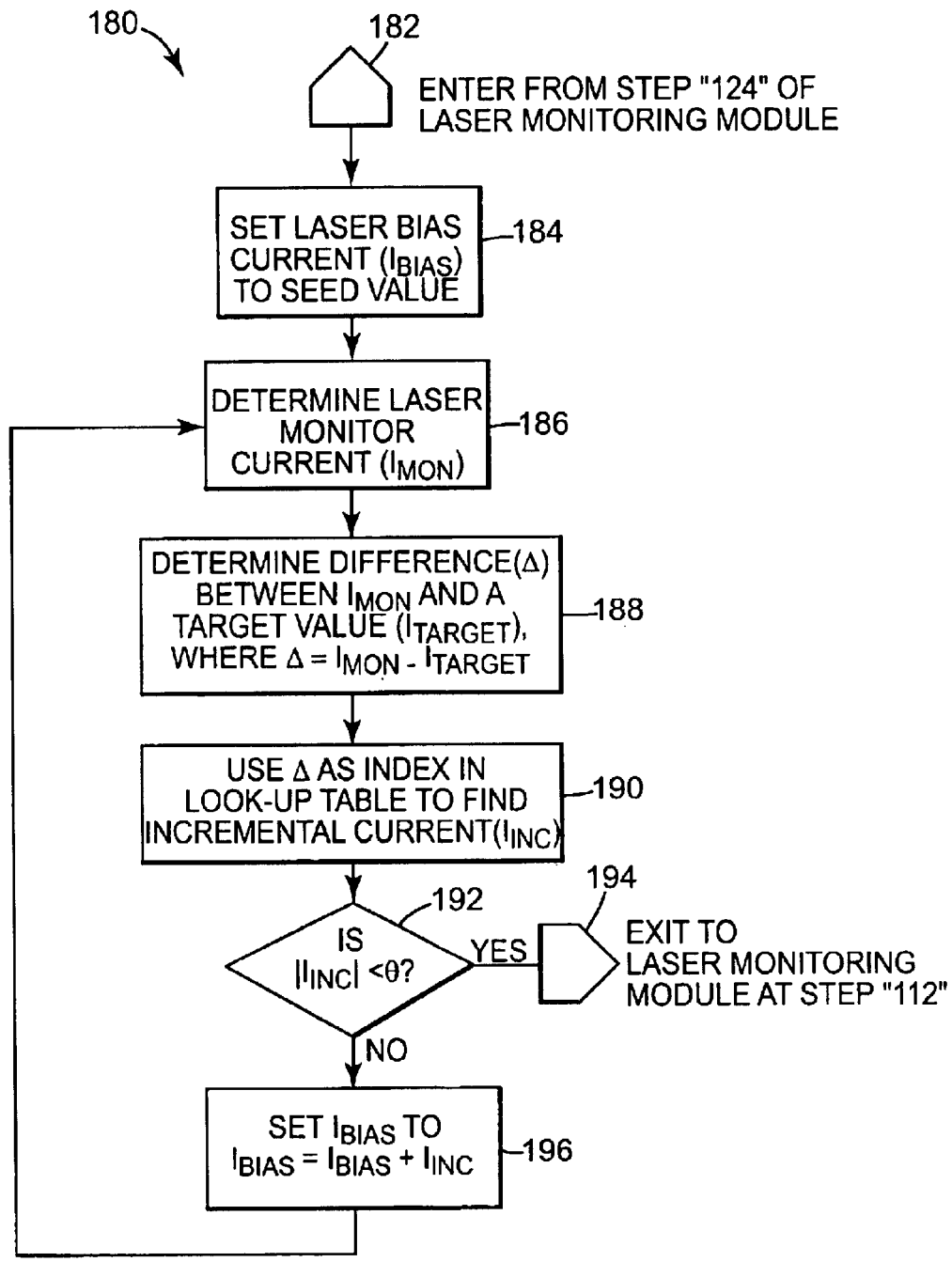
FIG. 6B is a flow diagram illustrating one exemplary embodiment of a process for initializing a laser of an optical transceiver module according to the present invention.

FIG. 6B is a flow diagram illustrating one exemplary embodiment of a process 180 for initializing laser 72 according to the present invention. Process 180 begins at step 182 after a laser monitoring process determines that laser 72 output power is not stable, such as at step 124 of laser monitoring process 120 illustrated by FIG. 2. Process 180 then proceeds to step 184 where microcontroller 36 reads a laser bias current seed value from memory block 62. The seed value is a value of laser bias current that resulted in laser 72 producing an optical output signal at manufacturer that had an output power level within a desired output power level target range. Microcontroller 36 stores the seed value in laser bias current control circuit 76, causing control circuit 76 to bias laser 72 with a bias current ($I_{BIAS}$) having a value substantially equal to the seed value.

Process 180 then proceeds to step 186 where microcontroller 36 reads a value of an optical output signal monitoring current ($I_{MON}$) from laser output power sensing circuit 74. In one embodiment, laser output power sensing circuit 74 comprises a photodiode that samples the optical output signal provided by laser 72 and provides the $I_{MON}$ current level which has a value representative of the optical output power of laser 72.

Process 180 then proceeds to step 188, where the microcontroller 36 determines the difference ($\Delta$) between $I_{MON}$ read during step 186 and a desired target value ($I_{TARGET}$) for $I_{MON}$ stored in memory block 62. Process 180 then proceeds to step 190 where microcontroller 36 uses the $\Delta$ value as an index for a look-up table stored in memory block 62. The look-up table contains an index of predetermined incremental current values ($I_{INC}$) based on the $\Delta$ value that must be added to $I_{BIAS}$ so that laser 72 will provide an optical output signal having an output power level within a desired range.

Process 180 then proceeds to step 192 where the absolute value of $I_{INC}$ is compared to a desired value ($\gamma$) stored in memory block 62. If the absolute value of $I_{INC}$ is less than γ, process 180 proceeds to step 194 where it exits to step 112 of laser monitoring process 120 illustrated by FIG. 4. If the absolute value of $I_{INC}$ is greater than or equal to γ, process 180 proceeds to step 196. At step 196, microcontroller 36 adds the incremental current value $I_{INC}$ to $I_{BIAS}$ and stores this adjusted value of $I_{BIAS}$ in laser bias control circuit 76. Bias current control circuit 76 then biases laser 72 with a bias current having a value substantially equal to the adjusted value of $I_{BIAS}$ resulting in laser 72 providing an optical output signal having an output power level substantially within a desired range.

Figure 6C:
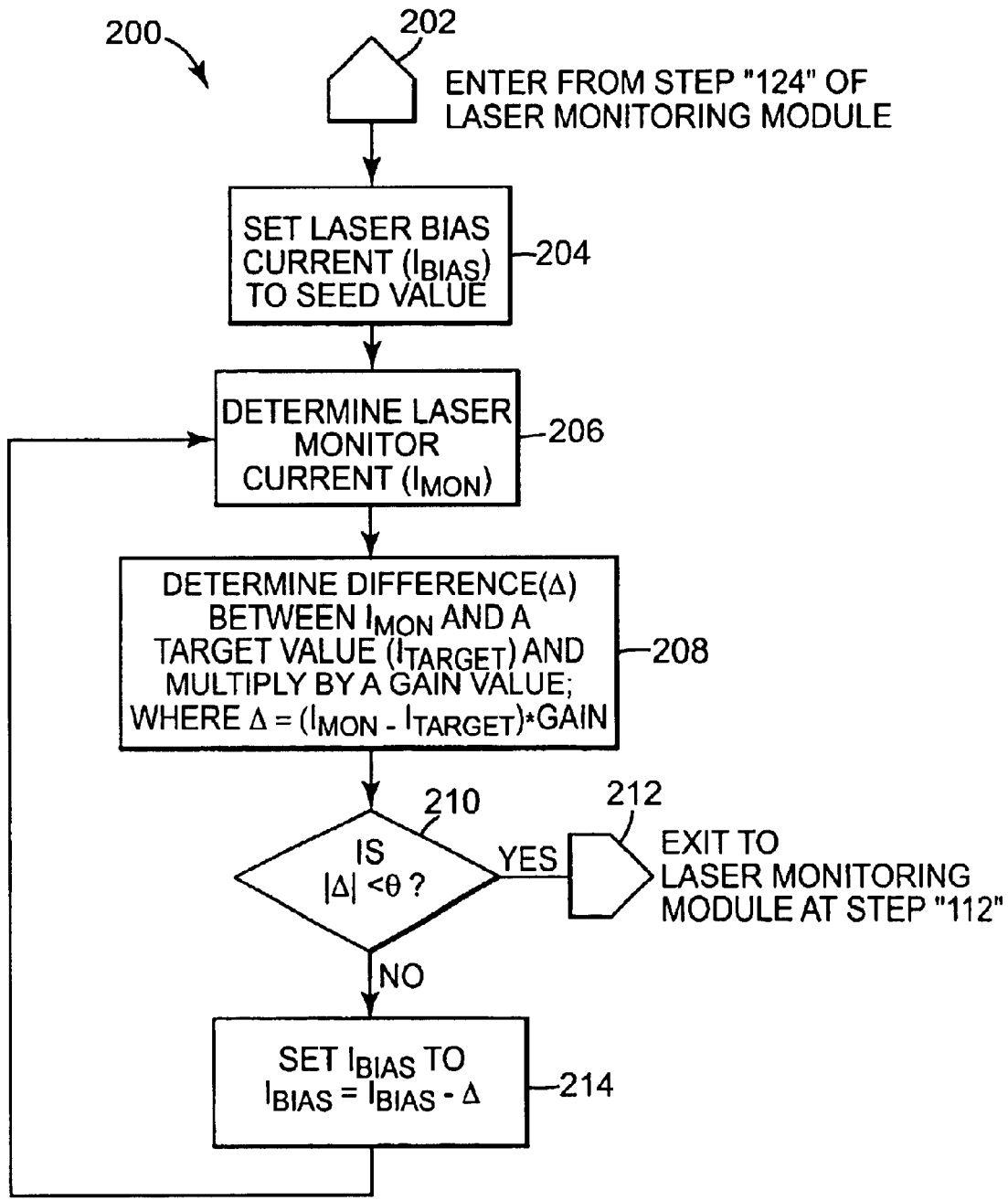
FIG. 6C is a flow diagram illustrating one exemplary embodiment of a process for initializing a laser of an optical transceiver module according to the present invention.

FIG. 6C is a flow diagram illustrating one exemplary embodiment of a process 200 for initializing laser 72 according to the present invention. Process 200 begins at step 202 after a laser monitoring process determines that laser 72 output power is not stable, such as at step 124 of laser monitoring process 120 illustrated by FIG. 2. Process 200 then proceeds to step 204 where microcontroller 36 reads a laser bias current seed value from memory block 62. The seed value is a value of laser bias current that resulted in laser 72 producing an optical output signal at manufacturer that had an output power level within a desired output power level target range. Microcontroller 36 stores the seed value in laser bias current control circuit 76, causing control circuit 76 to bias laser 72 with a bias current ($I_{BIAS}$) having a value substantially equal to the seed value.

Process 200 then proceeds to step 206 where microcontroller 36 reads a value of an optical output signal monitoring current ($I_{MON}$) from laser output power sensing circuit 74. In one embodiment, laser output power sensing circuit 74 comprises a photodiode that samples the optical output signal provided by laser 72 and provides the $I_{MON}$ current level which has a value representative of the optical output power of laser 72.

Process 200 then proceeds to step 208, where the microcontroller 36 determines the difference (Δ) between $I_{MON}$ read during step 206 and a desired target value ($I_{TARGET}$) for $I_{MON}$ stored in memory block 62, and then multiplies the Δ value by a gain value which is also stored in memory block 62 to generate an adjusted Δ value=($I_{MON}-I_{TARGET}$)*(gain value).

Process 200 then proceeds to step 210 where the absolute value of the adjusted Δ value is compared to a desired value (γ) stored in memory block 62. If the absolute value of the adjusted Δ value is less than γ, process 200 proceeds to step 212 where it exits to step 112 of laser monitoring process 120 illustrated by FIG. 4. If the absolute value of the adjusted Δ value is greater than or equal to γ, process 200 proceeds to step 214. At step 214, microcontroller 36 subtracts the adjusted Δ value from $I_{BIAS}$ and stores this adjusted value of $I_{BIAS}$ in laser bias control circuit 76. Bias current control circuit 76 then biases laser 72 with a bias current having a value substantially equal to the adjusted value of $I_{BIAS}$ resulting in laser 72 providing an optical output signal having an output power level substantially within a desired range.

Figure 6D:
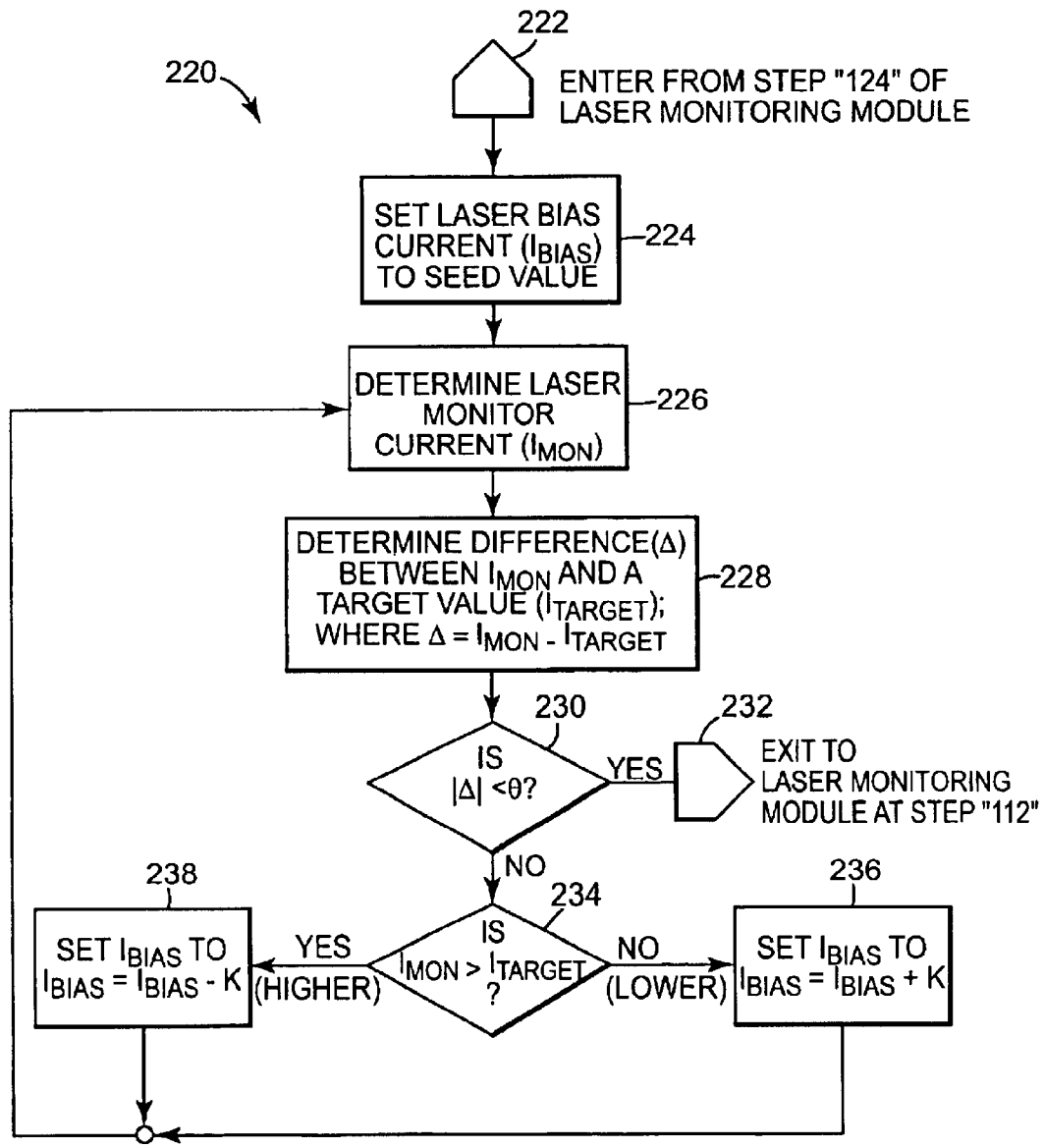
FIG. 6D is a flow diagram illustrating one exemplary embodiment of a process for initializing a laser of an optical transceiver module according to the present invention.

FIG. 6D is a flow diagram illustrating one exemplary embodiment of a process 220 for initializing laser 72 according to the present invention. Process 220 begins at step 222 after a laser monitoring process determines that laser 72 output power is not stable, such as at step 124 of laser monitoring process 120 illustrated by FIG. 2. Process 200 then proceeds to step 224 where microcontroller 36 reads a laser bias current seed value from memory block 62. The seed value is a value of laser bias current that resulted in laser 72 producing an optical output signal at manufacturer that had an output power level within a desired output power level target range. Microcontroller 36 stores the seed value in laser bias current control circuit 76, causing control circuit 76 to bias laser 72 with a bias current ($I_{BIAS}$) having a value substantially equal to the seed value.

Process 220 then proceeds to step 226 where microcontroller 36 reads a value of an optical output signal monitoring current ($I_{MON}$) from laser output power sensing circuit 74. In one embodiment, laser output power sensing circuit 74 comprises a photodiode that samples the optical output signal provided by laser 72 and provides the $I_{MON}$ current level which has a value representative of the optical output power of laser 72. Process 220 then proceeds to step 228, where microcontroller 36 determines the difference (Δ) between $I_{MON}$ read during step 206 and a desired target value ($I_{TARGET}$) for $I_{MON}$ stored in memory block 62. Process 220 then proceeds to step 230 where the absolute value of Δ is compared to a desired value (Θ) stored in memory block 62. If the absolute value of Δ is less than Θ, process 220 proceeds to step 232 where it exits to step 112 of laser monitoring process 120 illustrated by FIG. 4. If the absolute value of Δ is greater than or equal to Θ, process 220 proceeds to step 234. At step 234, microcontroller 36 compares $I_{MON}$ to $I_{TARGET}$.

If $I_{MON}$ is less than $I_{TARGET}$, process 220 proceeds to step 236. At step 236, microcontroller 36 adds a predetermined constant value (K) stored in memory block 62 to $I_{BIAS}$ and stores this adjusted value of $I_{BIAS}$ in laser bias control circuit 76. Bias current control circuit 76 then biases laser 72 with a bias current having a value substantially equal to the adjusted value of $I_{BIAS}$ resulting in laser 72 providing an optical output signal having an output power level substantially within a desired range.

If $I_{MON}$ is greater than $I_{TARGET}$, process 220 proceeds to step 238. At step 238, microcontroller 36 subtracts a predetermined constant value (K) stored in memory block 62 from $I_{BIAS}$ and stores this adjusted value of $I_{BIAS}$ in laser bias control circuit 76. Bias current control circuit 76 then biases laser 72 with a bias current having a value substantially equal to the adjusted value of $I_{BIAS}$ resulting in laser 72 providing an optical output signal having an output power level substantially within a desired range.

Figure 6E:
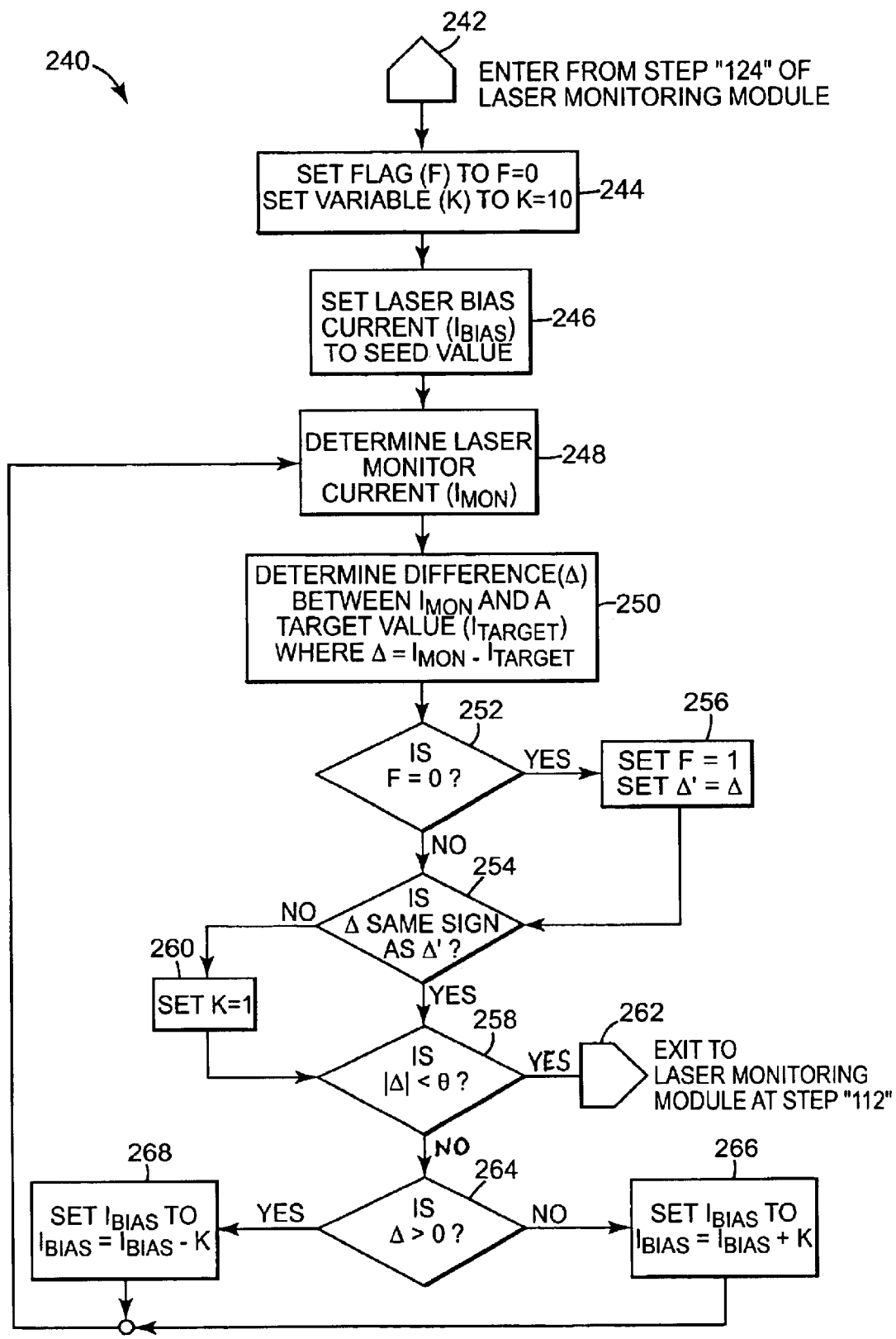
FIG. 6E is a flow diagram illustrating one exemplary embodiment of a process for initializing a laser of an optical transceiver module according to the present invention.

FIG. 6E is a flow diagram illustrating one exemplary embodiment of a process 240 for initializing laser 72 according to the present invention. Process 240 begins at step 242 after a laser monitoring process determines that laser 72 output power is not stable, such as at step 124 of laser monitoring process 120 illustrated by FIG. 2. Process 240 then proceeds to step 244 where microcontroller 36 sets a flag (F) to a value of zero and a variable (K) to a value of ten. At step 246, microcontroller 36 reads a laser bias current seed value from memory block 62. The seed value is a laser bias current value that resulted in laser 72 producing an optical output signal at manufacture that had an output power level with a desired output power level target range. Microcontroller 36 stores the seed value in laser bias control circuit 76, causing control circuit 76 to bias laser 72 with a bias current ($I_{BIAS}$) having a value substantially equal to the seed value.

Process 240 then proceeds to step 248 where microcontroller 36 reads a value of an optical output signal monitoring current ($I_{MON}$) from laser output power sensing circuit 74. In one embodiment, laser output sensing circuit 74 comprises a photodiode that samples the optical output signal provided by laser 72 and provides the $I_{MON}$ current level which has a value representative of the optical output power of laser 72. At step 250, microcontroller 36 determines the difference (Δ) between $I_{MON}$ read during step 206 and a desired target value ($I_{TARGET}$) for $I_{MON}$ stored in memory block 62.

Process 240 then proceeds to step 252, where microcontroller 36 queries whether flag (F) is equal to zero. If the answer is "no," process 240 proceeds to step 254. If the answer is "yes," process 240 proceeds to step 256 where microcontroller 36 sets the value of flag (F) to a value of one, and the value of a variable (Δ') equal to the difference Δ.

At step 254, microcontroller 36 queries whether the sign of the difference Δ is the same as the sign of the variable Δ'. If the answer is "yes," process 240 proceeds to step 258. If the answer is "no," process 240 proceeds to step 260 where microcontroller 36 sets the variable K to a value of one.

At step 258, microcontroller 36 queries whether the absolute value of Δ is less compared to a desired value (Θ) stored in memory block 62. If the absolute value of Δ is less than Θ, process 240 proceeds to step 262 where it exits to step 112 of laser monitoring process 120 illustrated by FIG. 4. If the absolute value of Δ is greater than or equal to Θ, process 240 proceeds to step 264.

At step 264, microcontroller 36 queries whether the difference Δ is greater than a value of zero. If Δ is less than zero, process 240 proceeds to step 266 where microcontroller 36 adds the value of variable K to $I_{BIAS}$ and stores this adjusted value of $I_{BIAS}$ in laser bias control circuit 76. If Δ is greater than zero, process 240 proceeds to step 268 where microcontroller 36 subtracts the value of variable K from $I_{BIAS}$ and stores this adjusted value of $I_{BIAS}$ in laser bias control circuit 76. Laser bias control circuit 76 then biases laser 72 with a bias current having a value substantially equal to the adjusted value of $I_{BIAS}$, and process 240 returns to step 248.

One advantage to using a laser, such as laser 72, it that it provides an optical output signal having a far higher power level than a light emitting diode (LED) or other light emitting element, especially when the optical signal is directed into a small-core optical fiber, such as optical fiber 42. One disadvantage is that the optical output power of a laser is temperature dependent. For instance, a laser biased with a bias current having a set value will provide an optical signal having a first power level at a first temperature and an optical signal having a second power level at a second temperature.

With this in mind, one method of improving the laser bias current seed value stored in memory block 62 is a bias current value that resulted in laser 72 providing an optical signal having a power level within a desired range at a temperature value present when optical transceiver module was manufactured and tested. The likelihood that the temperature of optical transceiver 30 when laser 72 is initialized will match the temperature at manufacturing is small. Thus, one way of improving laser initialization processes 160, 180, 200, and 220 as illustrated respectively by FIGS. 6A, 6B, 6C, 6D is to use a current value of the temperature at initialization of laser 72 as provided by temperature sensing circuit 78 to adjust the laser bias current seed value stored in memory block 62 prior to storing it in laser bias current control circuit 76.

Figure 6F:
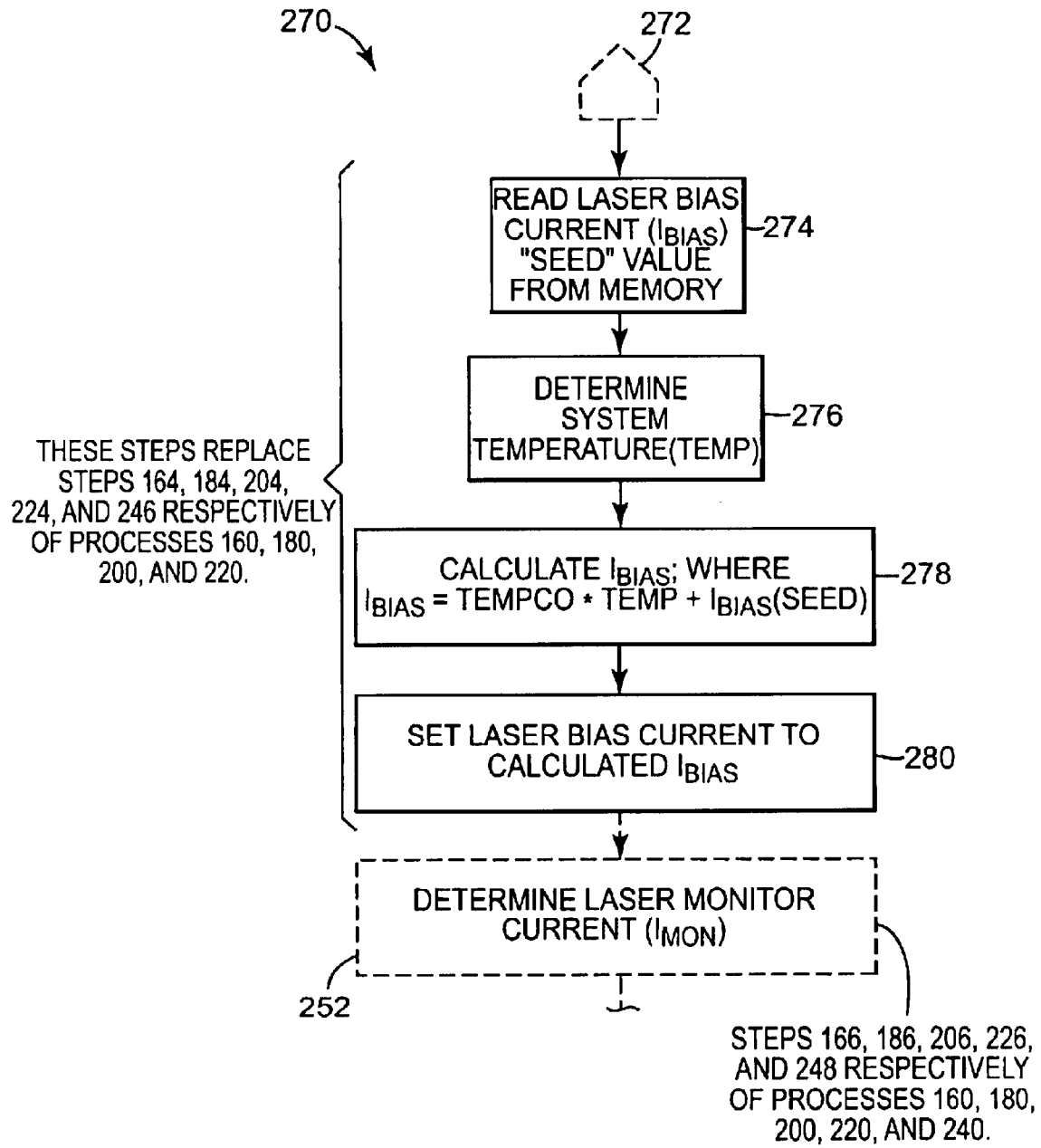
FIG. 6F is a flow diagram illustrating one exemplary embodiment of a process for improving the initialization of a laser of an optical transceiver module according to the present invention.

FIG. 6F is a flow diagram illustrating one exemplary embodiment of a process 270 for adjusting the laser bias seed value stored in memory block 62 based on the temperature of optical transceiver module 30 in order to provide a laser biasing current that will result in laser 72 providing an optical signal at initialization that is closer to a desired target range. Process 270 replaces steps 164, 184, 204, 224, and 246 respectively of laser initialization processes 160, 180, 200, 220, and 240.

Process 270 begins at step 272 after a laser monitoring process determines that laser 72 output power is not stable, such as at step 124 of laser monitoring process 120 illustrated by FIG. 2. Process 270 then proceeds to step 274 where microcontroller 36 reads the laser bias current seed value ($I_{BIAS}$) from memory block 62. Process 270 then proceeds to step 276 where microcontroller 36 reads a temperature value (TEMP) from temperature sensing circuit 78 that is indicative of the current temperature of laser 72.

Process 270 then proceeds to step 278 where microcontroller 36 determines a temperature-adjusted value for $I_{BIAS}$ that is equal to the seed value of $I_{BIAS}$ plus the product of the multiplication of the current laser temperature (TEMP) and a temperature constant (TEMPCO) stored in memory block 62. Process 270 then proceeds to step 280 where microprocessor 36 stores the temperature-adjusted value for $I_{BIAS}$ in laser bias control circuit 76. Laser bias control circuit 76 then biases laser 72 with the temperature-adjusted value of $I_{BIAS}$.

Process 270 then proceeds to step 282, which is the equivalent of steps 166, 186, 206, 226, and 248 respectively of laser initialization processes 160, 180, 200, 220, and 240. By incorporating process 270 as described above, laser initialization processes 160, 180, 200, 220, and 240 as illustrated by FIGS. 6A, 6B, 6C, 6D, and 6E, respectively, will be improved and laser 72 will more quickly provide an optical output signal that is within the desired power range.

In conclusion, by adjusting an initializing laser bias current value stored in a transceiver module at manufacturing to account for the actual temperature present at the time of laser initialization, transceiver module 30 according to the present invention can more quickly and accurately provide an optical output signal that is within a desired power range upon laser initialization. Additionally, the time required for laser initialization can be further reduced by employing extrapolation techniques and look-up tables to directly determine a laser bias current that will produce an output signal within a desired output range, as opposed to the conventional iterative techniques of incrementing and decrementing the laser bias current.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An optical transceiver module comprising:
   a laser configured to provide an optical output signal having a power level that is based on a bias current level; and
   a controller configured to cause the laser to be biased with a bias current having a bias current level, to receive a monitoring signal having a monitoring signal level indicative of the power level, to compare the monitoring signal level to a desired monitoring signal level range substantially centered on a monitoring signal target level, and to adjust the bias current level based on a difference between the monitoring signal level and monitoring signal target level if the monitoring signal level is not within the desired monitoring signal level range.

2. The optical transceiver of claim 1 further comprising:
a sensor configured to provide the monitoring signal.

3. The optical transceiver of claim 2 further comprising:
a transmitter which includes the sensor and the laser.

4. The optical transceiver module of claim 1, wherein the laser provides the optical output signal at a power level within a desired power level range when the monitoring signal level is within the monitoring signal level range.

5. A method of initializing a laser in an optical transceiver module, the method comprising:
providing, with the laser, an optical output signal having a power level that is based on a bias current level; and
biasing the laser with a bias current level;
receiving a monitoring signal having a monitoring signal level indicative of the power level;
comparing the monitoring signal level to a desired monitor signal level range substantially centered on a monitor signal target level; and
adjusting the bias current level based on a difference between the monitoring signal level and monitoring signal target level if the monitoring signal level is not within the desired monitoring signal level range.

6. The method of claim 5 further comprising:
providing the monitoring signal.

7. The method of claim 5 further comprising:
providing the optical output signal having a power level within a desired power level range when the monitoring signal level is within the desired monitoring signal level range.

8. The method of claim 5 further comprising:
biasing the laser initially with an initial bias current level which is determined at manufacture to cause the laser to provide an optical output signal having a power level resulting in the monitoring signal having a monitoring signal level within the desired monitoring signal level range; and
adjusting the initial bias current to reflect a present optical transceiver module temperature prior to biasing the laser with the initial bias current level.

9. A method of setting a laser bias current in a laser in an optical transceiver module, the method comprising:
setting the laser bias current to a bias current value;
determining a laser monitor current level indicative of an a optical output power of the laser corresponding to the laser bias current value;
determining whether the laser monitor current level is within a desired laser monitor current level range;
determining a difference ($\Delta$) between the laser monitor current level and a laser monitor current target level when the laser monitor current level is not within the desired laser monitor current level range, wherein the laser monitor current target level is within the desired laser monitor current level range; and
setting the laser bias current to an adjusted value based on $\Delta$.

10. The method of claim 9 further comprising:
determining a laser monitor current level with the laser bias current value at the adjusted value; and
determining a second difference ($\Delta 2$) between the laser monitor current level with the laser bias current value at the adjusted value and the laser monitor current target level.

11. The method of claim 10 further comprising:
setting the laser bias current value to a new adjusted value based on $\Delta 2$.

12. The method of claim 9 further comprising:
indexing a look-up table with $\Delta$ to provide a bias current variable;
setting the laser bias current to the adjusted value based on the bias current variable.

13. The method of claim 12 wherein the bias current variable is an incremental current value, wherein the method comprises:
setting the laser bias current to the adjusted value which is substantially equal to the first value plus the incremental current value.

14. The method of claim 9 further comprising:
indexing a look-up table with $\Delta$ to provide a bias current variable; and
evaluating the bias current variable to determine if the laser bias current is to be adjusted.

15. The method of claim 9 further comprising:
setting the laser bias current initially to a bias current level which is determined at manufacture to result in the laser monitor current level being within the desired laser monitor current level range; and
adjusting the initial bias current level to reflect a present optical transceiver module temperature prior to setting the laser bias current to the initial bias current level.

16. The method of claim 9 further comprising:
multiplying a gain by $\Delta$;
setting the laser bias current to the adjusted value based on the gain multiplied by $\Delta$.

17. The method of claim 16 wherein the method comprises:
setting the laser bias current to the adjusted value which is substantially equal to the first value minus the gain multiplied by $\Delta$.

18. The method of claim 9 further comprising:
multiplying a gain by $\Delta$; and
evaluating the gain multiplied by $\Delta$ to determine if the laser bias current is to be adjusted.

19. The method of claim 9 further comprising:
setting the laser bias current to the adjusted value which is less than the first value if the first laser monitor current is greater than the laser target current.

20. The method of claim 19 comprising:
setting the laser bias current to the adjusted value which is substantially equal to the first value minus a constant if the first laser monitor current is greater than the laser target current.

21. The method of claim 9 further comprising:
setting the laser bias current to the adjusted value which is greater than the first value if the first laser monitor current is less than the laser target current.

22. The method of claim 21 comprising:
setting the laser bias current to the adjusted value which is substantially equal to the first value plus a constant if the first laser monitor current is less than the laser target current.

23. The method of claim 9 further comprising:
evaluating Δ to determine if the laser bias current is to be adjusted.

24. The method of claim 23 further comprising:
evaluating the absolute value of Δ to determine if the laser bias current is to be adjusted.

25. The method of claim 9 further comprising:
evaluating a sign of Δ to determine if the laser bias current is to be adjusted with a coarse granularity adjustment or with a fine granularity adjustment.

26. The method of claim 9 further comprising:
setting the laser bias current to the adjusted value with a coarse granularity adjustment.

27. The method of claim 26 further comprising:
determining a second laser monitor current with the laser bias current at the adjusted value;
determining a second difference (Δ2) between the second laser monitor current and the laser target current;
setting the laser bias current to a new adjusted value with a fine granularity adjustment based on Δ2.

28. The method of claim 26 further comprising:
determining a second laser monitor current with the laser bias current at the adjusted value;
determining a second difference (Δ2) between the second laser monitor current and the laser target current; and
comparing the sign of Δ2 to the sign of Δ.

29. The method of claim 28 further comprising:
if the sign of Δ2 is the same as the sign of Δ, setting the laser bias current to a new adjusted value with the coarse granularity adjustment.

30. The method of claim 28 further comprising:
if the sign of Δ2 is the different than the sign of Δ, setting the laser bias current to a new adjusted value with a fine granularity adjustment.

31. The method of claim 9 comprising:
if the absolute value of Δ is greater than a desired value, setting the laser bias current to the adjusted value.

32. The method of claim 31 further comprising:
setting the laser bias current to the adjusted value which is less than the first value if Δ is greater than zero.

33. The method of claim 32 comprising:
setting the laser bias current to the adjusted value which is substantially equal to the first value minus a constant if Δ is greater than zero.

34. The method of claim 31 further comprising:
setting the laser bias current to the adjusted value which is greater than the first value if Δ is less than zero.

35. The method of claim 34 comprising:
setting the laser bias current to the adjusted value which is substantially equal to the first value plus a constant if Δ is less than zero.

36. A method of setting a laser bias current in a laser in optical transceiver module, the method comprising:
providing the laser bias current at a bias current value;
determining a laser monitor current with the laser bias current at the bias current value;
determining if the laser monitor current with the laser bias current at the bias current value is within a desired range;
incrementing the bias current value by an amount to provide an incremented bias current value if the laser monitor current is not within the desired range;
determining a laser monitor current with the laser bias current at the incremented bias current value; and
adjusting the laser bias current value based on the bias current value, the laser monitor current with the laser bias current at the bias current value the incremented bias current value, and the laser monitor current with the laser bias current at the incremented bias current value.

37. The method of claim 36 further comprising:
providing the laser bias current initially at a bias current value which is determined at manufacture to result in the laser monitor current being within the desired range; and
adjusting the initially provided bias current value to reflect a present optical transceiver module temperature prior to providing the initially provided bias current value.

38. An optical transceiver module comprising:
a laser configured to provide an optical output signal having a power level that is based on a laser bias current level;
means for setting the laser bias current to a bias current level;
means for determining a laser monitor current indicative of the power level;
means for comparing the laser monitor current to a desired range substantially centered on a laser monitor target current;
means for determining a difference between the laser monitor current and laser monitor target current if the laser monitor current is not within the desired range, wherein the laser monitor target current is within the desired range; and
means for adjusting the laser bias current level based on the difference.

39. An optical transceiver module comprising:
a laser configured to provide an optical output signal having a power level that is based on a laser bias current;
means for providing the laser bias current at a bias current value;
means for determining a laser monitor current with the laser bias current at the bias current value;
means for determining if the laser monitor current with the laser bias current at the bias current value is within a desired range;
means for incrementing the bias current value by an amount to provide an incremented bias current value if the laser monitor current is not within the desired range;
means for determining a laser monitor current with the laser bias current at the incremented bias current value; and
means for adjusting the laser bias current based on the bias current value, the laser monitor current with the laser bias current at the bias current value, the incremented bias current value, and the laser monitor current with the laser bias current at the incremented bias current value.

40. The optical transceiver module of claim 1, wherein the bias current level is adjusted by an amount based on a magnitude of the difference between the monitoring signal level and the monitoring signal target level.

41. The optical transceiver module of claim 1, wherein the bias current level is adjusted based on a sign of a difference between the monitoring signal and the monitoring signal target level.

42. The optical transceiver module of claim 1, wherein the controller initially biases the laser with a bias current having an initial bias current level which is determined at manufacture to cause the laser to provide an optical output signal having a power level resulting in the monitoring signal having a monitoring signal level within the desired monitoring signal level range.

43. An optical transceiver module comprising:

a laser configured to provide an optical output signal having a power level based on a bias current level; and a controller configured to cause the laser to be biased with a bias current having a first level, to receive a monitoring signal having a first monitoring signal level indicative of the power level corresponding to the first bias current level, to compare the first monitoring signal level to a desired range, to cause the laser to be biased with a second bias current level when the first monitoring signal level is not within the desired range and to receive a second monitoring signal level indicative of the power level corresponding to the second bias current level, and to cause the laser to be biased with an adjusted bias current level based on the first and second bias current levels and the corresponding first and second monitoring signal levels.

44. The optical transceiver module of claim 43, wherein the second bias current level is an incremental amount greater than the first bias current level.

45. The optical transceiver module of claim 43, wherein the first bias current level comprises a level determined at manufacture to cause the laser to provide an optic output signal having a power level resulting in the monitoring signal having a monitoring signal level within the desired range.

46. The optical transceiver module of claim 45, wherein the first bias current level is stored in a memory internal to the controller.

47. The optical transceiver module of claim 43, wherein the adjusted bias level is based on an extrapolation from the first and second bias current levels and the corresponding first and second monitoring signal levels.

48. The method of claim 36, further comprising:

adjusting the laser bias current by extrapolating from the bias current value, the laser monitor current with the laser bias current at the bias current value, the incremented bias current value, and the laser monitor current with the laser bias current at the incremented bias current value.

* * * * *